(12) United States Patent
Kwak et al.

(10) Patent No.: US 8,380,814 B2
(45) Date of Patent: Feb. 19, 2013

(54) METHOD AND SYSTEM FOR REGISTERING FAVORITES AUTOMATICALLY

(75) Inventors: Yong-Jae Kwak, Seoul (KR); Se Jin Cheon, Seoul (KR); Tae Hyeon Park, Seongnam-si (KR); Sungwon Kim, Seoul (KR); Jang Won Seo, Seoul (KR); Beom Seok Seo, Seoul (KR)

(73) Assignee: NHN Corporation, Seongnam-si (KR)

( * ) Notice: Subject to any disclaimer, the term of this patent is extended or adjusted under 35 U.S.C. 154(b) by 1158 days.

(21) Appl. No.: 11/543,343

(22) Filed: Oct. 4, 2006

(65) Prior Publication Data

US 2007/0088820 A1 Apr. 19, 2007

(30) Foreign Application Priority Data

Oct. 4, 2005 (KR) .................. 10-2005-0093101

(51) Int. Cl.
*G06F 15/16* (2006.01)
(52) U.S. Cl. ...................... 709/218; 709/228
(58) Field of Classification Search .................. 709/218, 709/228
See application file for complete search history.

(56) References Cited

U.S. PATENT DOCUMENTS

| 6,088,707 | A  | * | 7/2000  | Bates et al. ............... 715/235 |
| 7,082,573 | B2 | * | 7/2006  | Apparao et al. ............ 715/745 |
| 7,284,191 | B2 | * | 10/2007 | Grefenstette et al. ........ 715/230 |
| 7,346,610 | B2 | * | 3/2008  | Ruthfield et al. ............. 707/3 |
| 2003/0084249 | A1 | * | 5/2003 | Johnson et al. .............. 711/133 |
| 2003/0126560 | A1 | * | 7/2003 | Kurapati et al. ............. 715/514 |
| 2006/0218112 | A1 | * | 9/2006 | Van De Sluis et al. .......... 707/1 |
| 2006/0259867 | A1 | * | 11/2006 | Watson et al. .............. 715/760 |
| 2008/0134042 | A1 | * | 6/2008 | Jankovich ................. 715/733 |

FOREIGN PATENT DOCUMENTS

KR 10-2003-0071346 A 9/2003

OTHER PUBLICATIONS

Johnson et al. "2Q: A Low Overhead High Performance Buffer Management Replacement Algorithm." 1994. Proceddings of the 20th VLDB Conference.*
Megiddo et al. "ARC: A Self-Tuning, Lowoverhead Replacement Cache". Mar. 31, 2003. USENIX File & Storage Technologies Conference (FAST)m San Francisco, CA.*
Shelley Powers. "UNIX Power Tools, 3rd Edition." Publisher: O'Reilly Media, Inc. Pub Date: Oct. 28, 2002. Print ISBN-13: 978-0-596-00330-2.*
Microsoft. Description of the Start Menu in Windows XP. Marc 2002.*
Office Action dated Oct. 26, 2006 from Korean Patent Application No. 10-2005-0093101.

* cited by examiner

*Primary Examiner* — Lynn Feild
*Assistant Examiner* — Bryan Lee
(74) *Attorney, Agent, or Firm* — H.C. Park & Associates, PLC

(57) ABSTRACT

An automatic favorites registration method and system which can automatically register a website address of a particular website when a local computer accesses the particular website, and also can adjustably determine whether to add the website address to favorites by avoiding an unconditional automatic registration of the website address to the favorites and considering a user's access trend. According to the present disclosure, there is provided an automatic favorites registration method and system which can automatically register a website which a local computer accesses, and also can register only an additional website which is determined to be optimal for a user's convenience, or maintain a favorites registration of the website according to the user's recent search trend.

14 Claims, 6 Drawing Sheets

<FAVORITES VOLUME>

| NO | WEB ADDRESS (WEBSIT) | FINAL VISIT TIME | NUMBER OF VISITS |
|---|---|---|---|
| 1 | www.A.com (SHOPPING A) | 20050830 1805 | 2 → 1 |
| 2 | www.B.com (GAME B) | 20050831 1221 | 8 |
| 3 | www.C.com (HEALTH C) | 20050831 1800 ↑ 20050831 1805 | 10 → 11 |
| 4 | www.D.com (BROADCASTING D) | 20050831 1311 | 1 |
| 5 | | | |

<WEB BROWSER> http://www.C.com

ACCESS TIME : 2005.08.31 18:05

<FAVORITES LIST>

HEALTH C
GAME B
BROADCASTING D
SHOPPING A

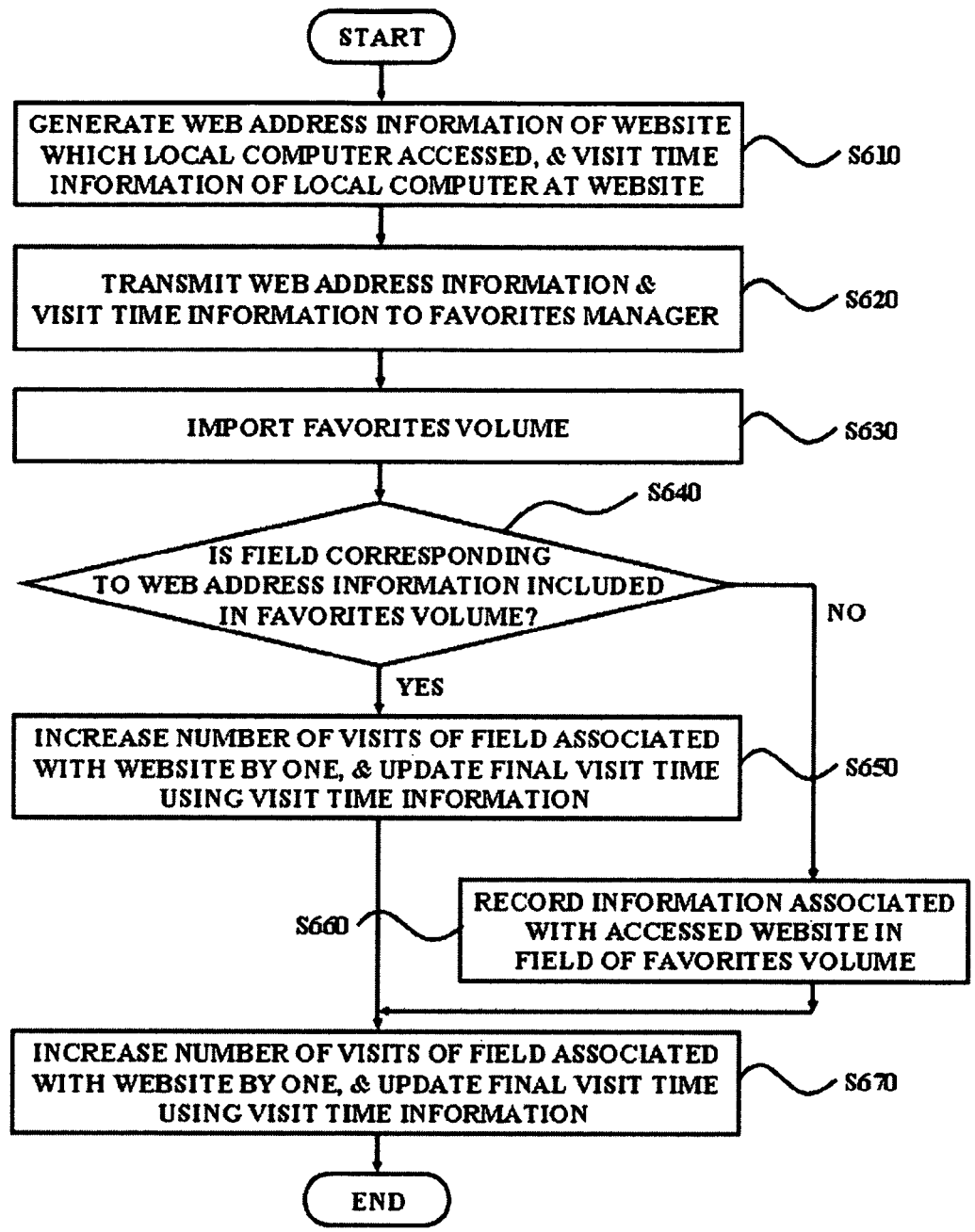

METHOD AND SYSTEM FOR REGISTERING FAVORITES AUTOMATICALLY

CROSS-REFERENCE TO RELATED APPLICATION

This application claims the benefit of Korean Patent Application No. 10-2005-0093101, filed on Oct. 4, 2005, in the Republic of Korea, the disclosure of which is incorporated herein by reference.

Background

1. Field of the Invention

The present disclosure relates to an automatic favorites registration method and system which can automatically register a website address of a particular website when a local computer accesses the particular website, and also can adjustably determine whether to add the website address to favorites by avoiding an unconditional automatic registration of the website address to the favorites and according to a user's access trend.

2. Description of Related Art

Favorites generally designates a service of manually registering, to a web browser, a web address of a website which a user frequently accesses, i.e. visits, according to the user's needs, and enables the user to easily access the website using a favorites list without requiring the user to input the address of the website, when the user re-accesses the website.

In the case of a manual favorites registration method, only a website limited to the user's needs may be registered in the favorites. Thus, it is possible to register only the user's desired website to the favorites, but in this case, the favorites service is provided with respect to only websites which were registered by the user. Also, the manual favorites registration method provides the favorites service, without considering the user's recent search trend. Thus, a website, which the user frequently accessed, but recently does not visit, may be included in the favorites.

Also, an automatic registration method of registering all the websites that the user visits to favorites, and facilitating a favorites registration process is suggested, but the automatic registration method may register an unnecessary website for a user to the favorites.

Accordingly, a new automatic favorites registration method which can facilitate a favorites registration process by automatically registering a website which a local computer accesses, and also can selectively register a website, which a user frequently visits, to favorites according to the user's access trend is desirable.

SUMMARY

The present disclosure provides an automatic favorites registration method and system which can automatically register a website, which a local computer accessed, to favorites and can additionally register only a website which is determined to be optimal for a user's easy access, to the favorites or can maintain a favorites registration of the website.

The present disclosure also provides an automatic favorites registration method and system which can maintain a favorites registration of a website, which a user has frequently accessed recently, from previously registered websites, and can cancel a website, which was registered in favorites but not frequently accessed by a user, and thereby help the user to register an additionally accessed website to the favorites.

The present disclosure also provides an automatic favorites registration method and system which can retrieve local data, which is recorded in a local computer, without executing another search program.

According to an aspect of the present disclosure, there is provided an automatic favorites registration method including: checking in a Browser Helper Object (BHO) manager, which is installed in a local computer, that the local computer accesses a website via a web browser which is installed in the local computer; generating web address information associated with the accessed website and visit time information of the local computer to the website in the BHO manager; transmitting the generated web address information and the visit time information from the BHO manager to a favorites manager which is installed in the local computer; importing a predetermined favorites volume in the favorites manager; checking in the favorites manager whether a field corresponding to the received web address information is included in the imported favorites volume; and updating the favorites volume according to a result of the check in the favorites manager, wherein the favorites manager generates a favorites list by referring to the updated favorites volume.

According to another aspect of the present disclosure, there is provided an automatic favorites registration system including: a BHO manager configured to check that a local computer accesses a website via a web browser, which is installed in the local computer, to generate web address information associated with the accessed website and visit time information of the local computer to the website, and to transmit the generated web address information and the visit time information to a favorites manager, the web browser, the favorites manager, and the BHO manager which are installed in the local computer; and where the favorites manager imports a predetermined favorites volume, checks whether information associated with the website is included in the imported favorites volume, and updates the favorites volume according to a result of the check.

BRIEF DESCRIPTION OF THE DRAWINGS

The above and/or other aspects and advantages of the present disclosure will become apparent and more readily appreciated from the following detailed description, taken in conjunction with the accompanying drawings of which:

FIG. 6 is a flowchart illustrating an automatic favorites registration method according to an exemplary embodiment of the present disclosure.

DETAILED DESCRIPTION

Figure 1:
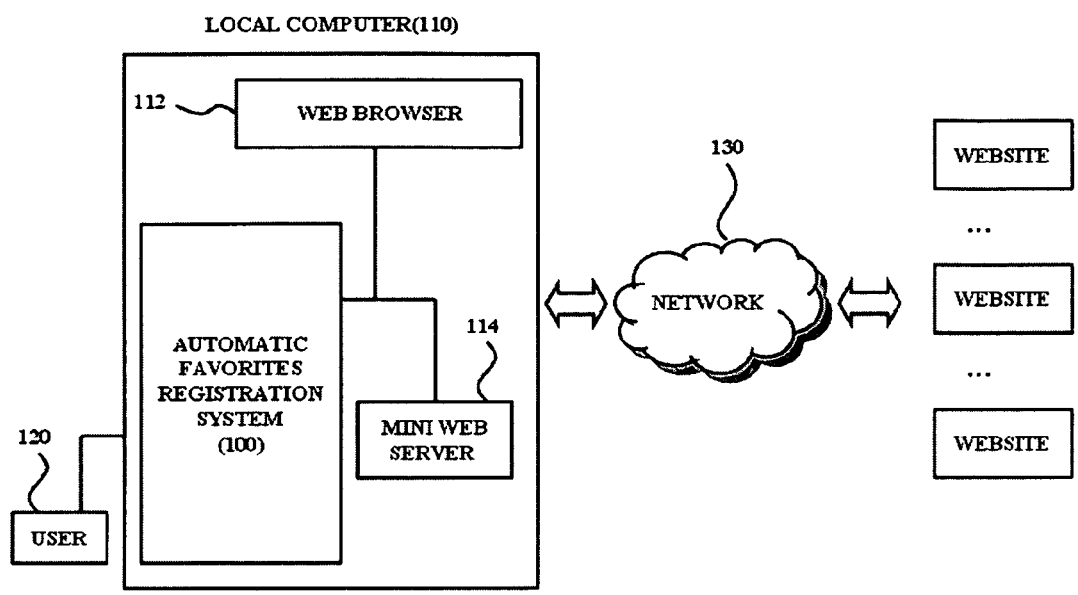
FIG. 1 is a block diagram illustrating an automatic favorites registration system according to an exemplary embodiment of the present disclosure.

Reference will now be made in detail to exemplary embodiments of the present disclosure, examples of which are illustrated in the accompanying drawings, wherein like reference numerals refer to the like elements throughout. The exemplary embodiments are described below in order to explain the present disclosure by referring to the figures.

Hereinafter, an automatic favorites registration method and system will be described with reference to the accompanying drawings.

The term "favorites" used throughout the present specification may designate a function of a web browser which selectively records a website, which a user previously accessed or the user frequently accesses, in a form of a list, and helps the user to easily access a corresponding web address by providing the user with a web address list when the user request a favorites list.

Accordingly, when a user who has registered a web address of a particular website to the favorites repeats visiting the website, the user may quickly access the website by importing the web address, which is registered in the favorites, without inputting the web address for every visit to the website.

Specifically, the present disclosure enables a web address of a particular website to be automatically registered in or added to favorites, when a user or a local computer accesses the website. In this case, the present disclosure avoids an unconditional automatic favorites registration, and determines whether to register the web address to favorites according to the user's access trend, and updates a favorites list.

Figure 2:
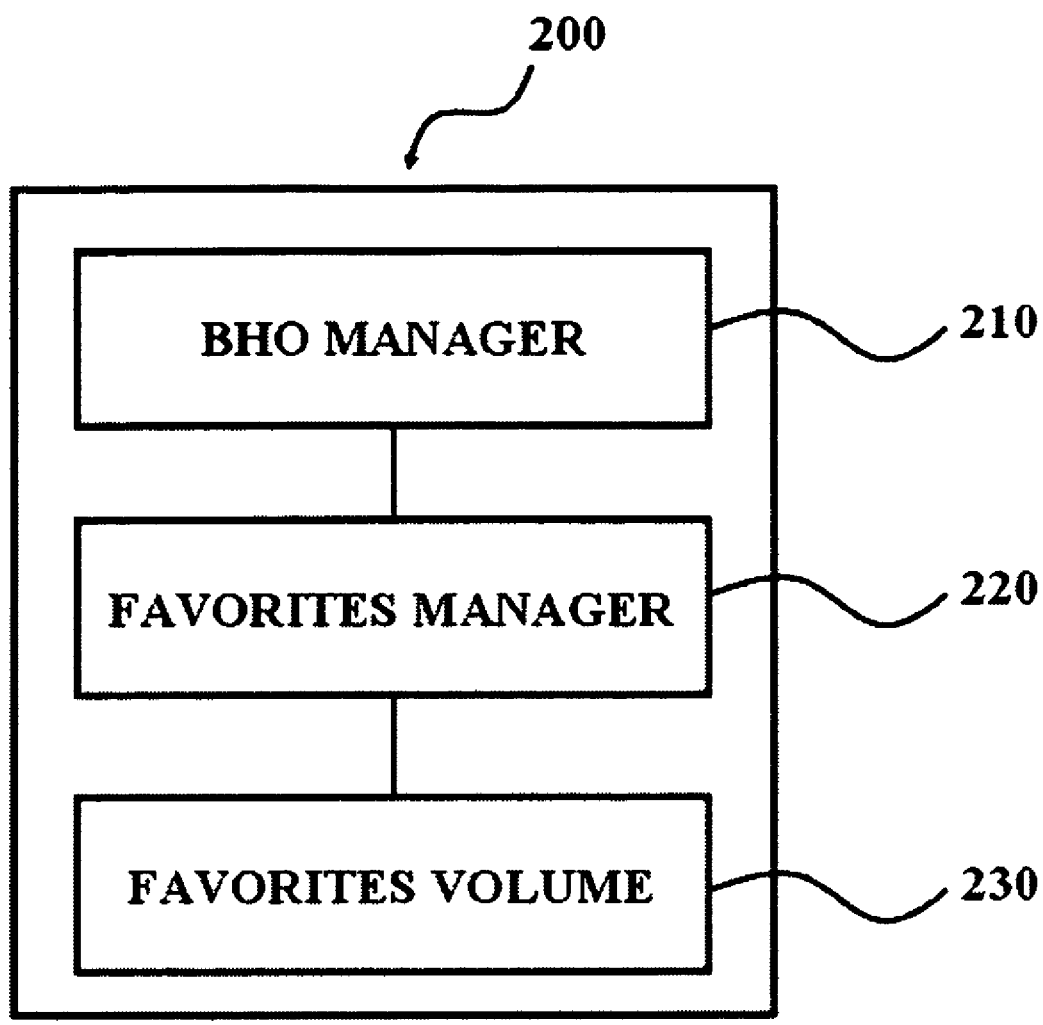
FIG. 2 is a configuration diagram illustrating an automatic favorites registration system according to an exemplary embodiment of the present disclosure.

FIG. 1 is a diagram illustrating an automatic favorites registration system 100 according to an exemplary embodiment of the present disclosure. FIG. 2 is a configuration diagram illustrating an automatic favorites registration system 200 according to an exemplary embodiment of the present disclosure.

The automatic favorites registration system 100 functions to automatically register a web address of a website, which a local computer 110 accessed, in favorites by using a web browser 112 which is installed in the local computer 110. Also, the automatic favorites registration system 100 functions to update a favorites volume 230 of FIG. 2 according to a user's 120 access trend. Here, the favorites volume 230 comprises information associated with generation of a favorites list. Also, the access trend shows the user's recent website access trend. For example, the access trend may be predicted based on a frequency that the user 120 accesses a particular website.

Accordingly, the automatic favorites registration system 100 according to the present exemplary embodiment may not register web addresses of all websites which the user 120 accesses, but may selectively register a web address of a website, which the user 120 frequently visits recently, in favorites.

The local computer 110 includes the web browser 112, and functions to access a particular website corresponding to a web address, which is input into the web browser 112, and functions to enable the user 120 to acquire information which is provided in the website. Particularly, the local computer 110 may include a Browser Helper Object (BHO) manager 210 of FIG. 2, and generate information associated with the website, which the local computer 110 accesses, via the BHO manager 210. Here, the BHO manager 210 enables a retrieval operation, with respect to data maintained in the local computer 110 (hereinafter, local data), to be performed in the web browser 112.

Specifically, the BHO manager 210 may be a type of an execution control program which is installed in the local computer 110. Also, the BHO manager 210 may provide the user 120 with a search result in a similar format to web searching by executing a predetermined mini web server 114 which is included in the local computer 110, and enabling local data to be retrieved in the web browser 112. The searching by the BHO manager 210 extracts the search result about the local data in a familiar format to the user 120 of the local computer 110, so that the user 120 may easily recognize the search result. Also, the local data may be retrieved by using the web browser 112 without executing another search program.

More specifically, when the web browser 112 is executed in the local computer 110, and in this status, a local data retrieval request is received from the user 120, the BHO manager 210 may retrieve particular local data via the already executing web browser 112, without executing an additional search program, for example, a computer search program.

Also, the BHO manager 210 may generate web address information of a website, which a local computer has accessed, and visit time information of the local computer to the website by executing a predetermined BHO. Thus, the BHO manager 210 may generate information associated with a particular website every time the local computer 110 accesses the particular website. Also, the BHO manager 210 may generate an environment where an accessed website may be automatically registered in favorites.

The web address information and the visit time information of the website, which is registered in the favorites, are recorded in corresponding fields of the favorites volume 230 of FIG. 2 by a favorites manager 220 of FIG. 2. Thus, an automatic favorites registration is enabled with respect to a corresponding website. The website information, which is recorded in the field of the favorites volume 230, may be utilized when generating a favorites list to be provided to the user 120 when the user 120 requests the favorites list.

The web browser 112 designates a type of a program which processes various types of information, which the local computer 110 acquires from an accessed website via a network 130, into a format that the user 120 may recognize, and provides the user 120 with the processed information. For example, the web browser 112 may include Microsoft Corporation's Internet Explorer, Netscape Corporation's Communicator, and the like. Specifically, the web browser 112 functions to provide the user 120 with a user interface for receiving a web address of a website, and to connect the local computer 110 to the website which is specified by the received web address.

Also, the web browser 112 may provide an input interface for receiving a search command from the user 120, and provide the user 120 with local data corresponding to a received keyword as a search result in the format of a web document. In this instance, the input interface may correspond to a general input interface for web searching. Specifically, as the user 120 inputs a keyword in an identical format as the general input interface for web searching, the web browser 112 may retrieve local data corresponding to the keyword from local data of the local computer 110.

The mini web server 114 may designate a type of search engine which is installed in the local computer 110. The mini web server 114 may communicate with the web browser 112 according to the HyperText Transport Protocol (HTTP) protocol, receive the search command of the user 120 with respect to the local data from the web browser 112, and provide the user 120 with the search result in the format of a web document via the web browser 112. The local computer 110 may maintain the local data of the local computer 110 in a local database which is a storage unit. Also, in a desktop search mode, i.e. when a local data retrieval request is received, the mini web server 114 searches the local database for corresponding local data in response to the local data retrieval request, and generates the search result in the format of the web document.

Specifically, the mini web server 114 functions to retrieve the local data of the local computer 110, converts the search result into the format of the web document, and provides the user with the search result. Here, the search result in the format of the web document designates a search result which a search engine of searching general websites provides the user 120. For example, the search result may include a data title, a data content summary, a storage location, and the like.

The user 120 may designate an Internet user or a local computer user who maintains the local computer 110 including the automatic favorites registration system 100, inputs a predetermined web address in the web browser 112 which is installed in the local computer 110, and receives information from a corresponding website.

The automatic favorites registration system 100 may generate information associated with a website, which the local computer 110 accesses via the BHO manager 210 which is installed in the local computer 110. Also, the automatic favorites registration system 100 may record the generated information in the favorites volume 230 according to the user's 120 access trend and thereby, enables an automatic favorites registration with respect to the accessed website.

Hereinafter, a configuration of an automatic favorites registration system 200 will be described with reference to FIG. 2.

The automatic favorites registration system 200 according to the present exemplary embodiment includes the BHO manager 210, the favorites manager 220, and the favorites volume 230.

The BHO manager 210 generates web address information of a website, which the local computer 210 has accessed, and visit time information of the local computer to the website, via the web browser 112, and transmits the generated web address information and the visit time information to the favorites manager 220. In this case, the BHO manager 210 basically functions to retrieve local data, in other words, to execute and control the mini web server 114 for desktop searching. Also, in the present exemplary embodiment, the BHO manager 210 functions to recognize the access between the local computer 110 and the website, generates information about the accessed website, such as web address information, visit time information, and the like, via the web browser 112, and transfers the generated information to the favorites manager 220 which substantially performs a favorites registration of the website. In this case, the web browser 112, the BHO manager 210, and the favorites manager 220 may be pre-installed in the local computer 110, and may perform a function which is assigned according to a predetermined execution control signal, for example, an access to a website of a predetermined web address, a retrieval of local data for desktop searching, generation of information associated with the accessed website, and the like.

Here, the web address information may be generated by referring to the web address of the website which the local computer 110 has accessed, i.e. a web address which is input into the web browser 112, such as a Universal Resource Locator (URL), an Internet Protocol (IP) address, a domain, and the like. The visit time information may be generated by measuring a point in time when information is provided to the user 120 via the access between the local computer 110 and the website.

Specifically, the BHO manager 210 may generate an environment where the website accessed by the local computer 110 is automatically registered in favorites by generating information about the website, for example, 'web address and visit time', and transmitting the generated 'web address and the visit time' to the favorites manager 220.

The favorites manager 220 imports the favorites volume 230, checks whether information associated with the website is included in the imported favorites volume 230, and updates the favorites volume 230 according to a result of the check. In this case, when information of the website accessed by the local computer 110 is recorded in the favorites volume 230, the favorites manager 220 automatically registers the website in the favorites.

Specifically, the favorites manager 220 may not register web addresses of all websites which the local computer 110 accesses, but may selectively register only a web address of a website which can provide the user 120 with substantial convenience, according to the user's 120 search trend.

For example, the favorites manager 220 may selectively register only a website which the user 120 has frequently accessed during a previous period of time to the most recent time. Also, the favorites manager 220 may automatically cancel a favorites registration of a website from websites, which are registered in favorites, when the user 120 never accessed the website during the previous period of time to the most recent time.

Accordingly, in the present exemplary embodiment, the automatic favorites registration may automatically register only a selected website according to the user's 120 access trend, while not requiring the user's 120 direct involvement in a favorites registration process.

For the automatic favorites registration, the favorites volume 230 may include a predetermined field which records information about the registered website. Also, the favorites volume 230 may include a corresponding website in the favorites list, based on the recorded information in the field.

Specifically, the favorites manager 220 may generate the favorites list by using website information which is recorded in the field of the favorites volume 230. Here, the favorites list is exposed to the user 120 to provide the user 120 with a favorites service.

The field may include information about the registered website, i.e. a web address of the website, which the local computer 110 has previously accessed, a last or most recent visit time, and a number of visits. Also, the field may include information about the favorites registration of the website, and a number of times that the user 120 accessed the website after the favorites registration.

A number of fields in the favorites volume 230 may be arbitrarily determined by an operator of the present system. For example, the number of fields may be limited according to a system environment or the size of favorites list data which is provided to the user 120.

The web address to be recorded in the field may be the web address, which is input into the web browser 112, to connect the local computer 110 to the website. Also, the last visit time may be a time when the local computer 110 finally accessed the website. Also, the number of visits may designate the number of times that the local computer 110 accessed the website after the favorites registration.

Specifically, the favorites manager 220 of the present disclosure checks whether information about the website accessed by the local computer 110 is included in the imported favorites volume 230, and updates the favorites volume 230 according to a result of the check.

More specifically, when the field corresponding to the web address information is not included in the favorites volume 230, the favorites manager 220 may record the web address and the last visit time in an empty field, which is identified from fields of the favorites volume 230, based on the received web address information and the visit time information, and record the number of visits as a natural number, for example, 1.

In this case, when all the fields of the favorites volume 230 are recorded and the empty field is unidentifiable, the favorites manager 220 may retrieve a field, which has less than n number of visits, from the fields, and identify the empty field by deleting information of the retrieved field. Also, when a plurality of fields, which has less than n number of visits, is retrieved, the favorites manager 220 may retrieve a field, which has an earliest last visit time, from the plurality of fields.

Specifically, when the fields of the favorites volume 230 are filled with information of other websites, the favorites manager 220 retrieves a field of a website, which is determined as useless since the user 120 has recently accessed the website the least, and deletes the information from the field.

However, when the user 120 is determined to frequently access the website which records information in the field of the favorites volume 230, the favorites manager 220 may not delete information of the field. Also, the favorites manager 220 may not register an additional website accessed by the local computer 110 in the favorites. This is because maintaining the favorites registration of the website, which is registered in the favorites, may be further helpful for the user's 120 convenience. For this, in the present exemplary embodiment, it may be possible to set the n as, for example, 1, and maintain a favorites registration of a website which the local computer 110 accessed a plurality of times.

Also, when the field corresponding to the web address information is included in the favorites volume 230, the favorites manager 220 updates the favorites volume 230 by changing the last visit time in the field corresponding to the web address information, based on the received visit time information, and increasing the number of visits by land recording the result of the increase.

Hereinafter, an example of automatically registering a particular website to favorites will be described with reference to FIGS. 3 through 6.

Figure 3:
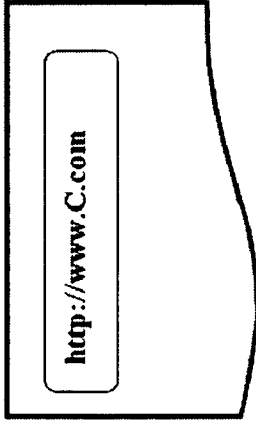
FIG. 3 is a diagram illustrating an example of updating a favorites volume when a user frequently accesses a website which is registered in favorites.
Figure 3:
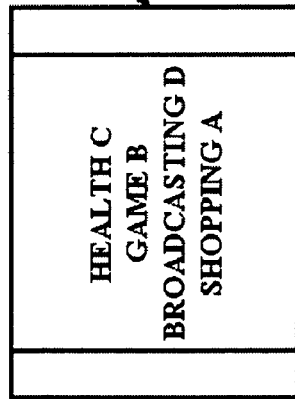

FIG. 3 is a diagram illustrating an example of updating a favorites volume when a user frequently accesses a website which is registered in favorites.

As described above, a predetermined number of fields for the favorites registration is included in the favorites volume 230 of the present disclosure. Each of the fields records information of a website, which is registered in the favorites, from websites which the user 120 accessed via the web browser 112 of the local computer 110. A web address, a last visit time, and a number of visits are recorded in the fields. The automatic favorites registration system 200 determines a website to be included in a favorites list according to the number of visits or the last visit time.

In FIG. 3, when the user 120 repeatedly inputs a web address, 'www.C.com', of a corresponding website via the web browser 112 with respect to the web address information 'www.C.com' of the website which is recorded in the field of the favorites volume 230, will be described.

Initially, the favorites manager 220 determines whether a field, which records information associated with the website, is included in the favorites volume 230 in correspondence to the website 'www.C.com' which the local computer 110 accessed. As a result of the determination, when the field is included in the favorites volume 230, the favorites manager 220 recognizes that the local computer's 110 access to the website was a re-access to the website which was registered in the favorites. Thus, the favorites manager 220 increases the number of visits to the field by 1, and changes the last visit time into the re-accessed time of the local computer's 110, and records the changed last visit time. For example, the favorites manager 220 increases the number of visits from '10' to '11', and changes the existing last visit time, '20050831 1800' (where the fields 2005/08/31/1800 correspond to year/month/day/time) into '20050831 1805'.

When the favorites volume 230 is updated or when an import of the favorites list is received from the user 120, the favorites manager 220 arranges fields of the favorites volume 230 according to the number of visits and the last visit time. For example, the favorites manager 220 may arrange the fields in an order of the greatest number of visits. Also, with respect to fields with the identical number of visits, the favorites manager 220 may assign a comparatively higher order to a field with a most recent last visit time.

As shown in FIG. 3, an example of generating a favorites list in the favorites volume 230 by the favorites manager 220 will be described.

Initially, the favorites manager 220 identifies a field where the number of visits or the last visit time with respect to the field of the favorites volume 230 is fixed during a predetermined time interval, and decreases the number of visits of the identified field by 1. This provides the favorites manager 220 a method to give a type of penalty to a website which the user 120 has not accessed during a predetermined period of time. Also, the favorites manager 220 may give some handicaps when determining a website to be included in the favorites list or an exposure location of the website in the favorites list.

Accordingly, the favorites manager 220 may identify that the number of visits is fixed at '2' since the local computer 110 has not accessed a website shopping A of FIG. 3 during the predetermined period of time, for example, two days, apply '−1' to the number of visits, and thereby decrease the number of visits from '2' to '1'.

Next, the favorites manager 220 may determine websites which are recorded in the fields of the favorites volume 230, such as, shopping A, game B, health C, and broadcasting D, as websites to be included in the favorites list. Also, the favorites manager 220 may generate the favorites list so that the website, health C, with the greatest number of visits, is located at the top of the favorites list. In this case, when assigning an order to the websites, shopping A and broadcasting D, with an identical number of visits of '1' in this example, the favorites manager 220 may assign a comparatively higher order to the website broadcasting D, which has a more recent last visit time of 200508311311 than the website shopping A, with the last visit time of 200508301805.

Accordingly, in FIG. 3, fields associated with the websites, health C, game B, broadcasting D, and shopping A, are sequentially arranged. The favorites manager 220 may generate the favorites list to correspond to the arranged fields, and provide the user 120 with the generated favorites list.

Figure 4:
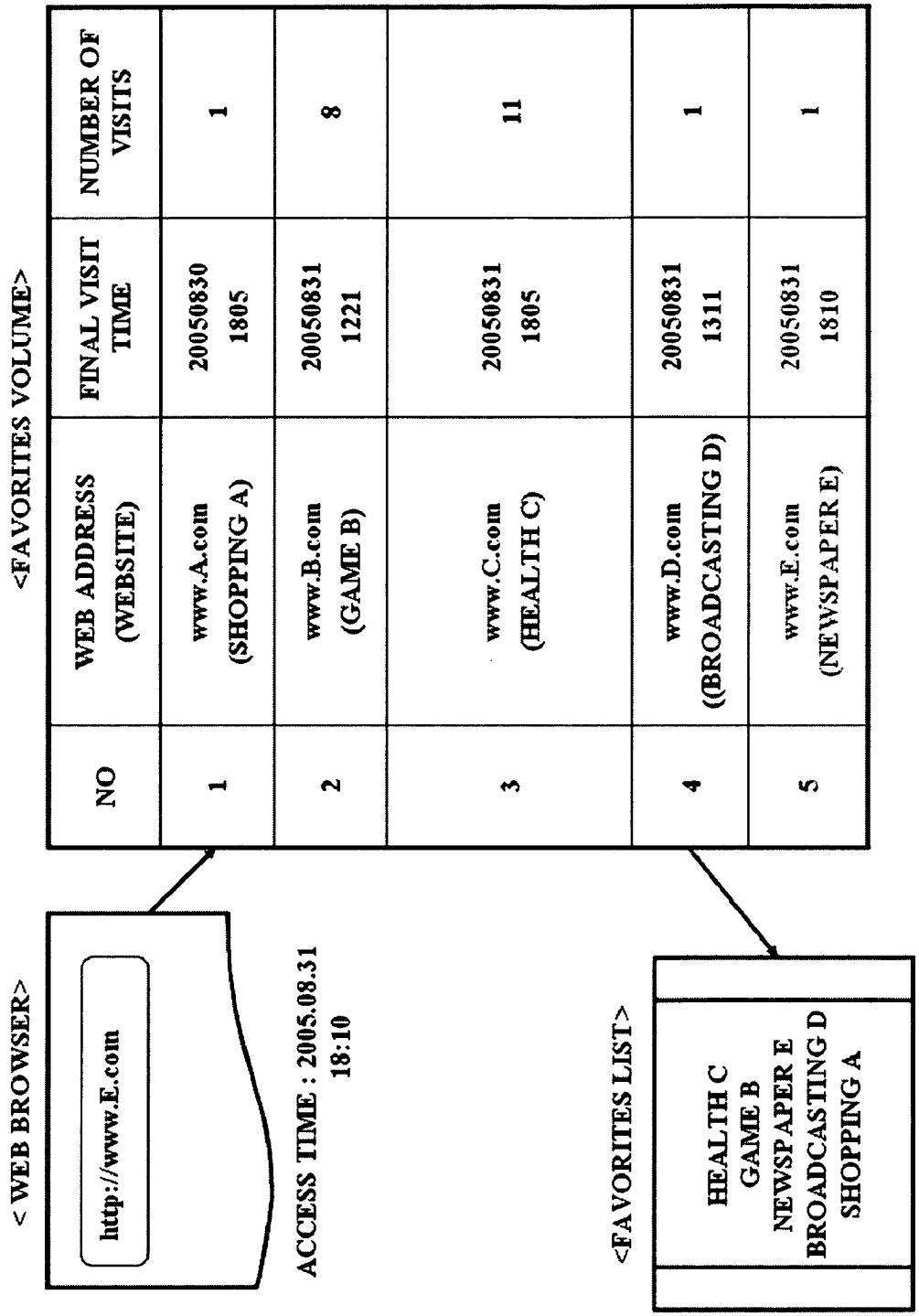
FIG. 4 is a diagram illustrating an example of recording information of a corresponding website in a field of a favorites volume when a user accesses a website which is unregistered in favorites.

FIG. 4 is a diagram illustrating an example of recording information of a corresponding website in a field of a favorites volume when a user accesses a website which is unregistered in favorites.

Initially, the favorites manager 220 determines whether website information about an accessed website, 'www.E.com', is recorded in the field of the favorites volume 230. As a result of the determination, when the information of the accessed website is neither recorded in the field nor registered in favorites, the favorites manager 220 identifies whether a field, i.e. an empty field, to record information about the website is included in the favorites volume 230. When the empty field is included in the favorites volume 230 as a result of the identification, the favorites manager 220 records the web address and the last visit time of the corresponding website in the empty field by using the web address information and the last visit time information which is received from the BHO manager 210. Also, the favorites manager 220 records the number of visits as 1.

When the field record is completed or when the user 120 imports the favorites list, the favorites manager 220 arranges a plurality of fields of the favorites volume 230 according to the number of visits and the last visit time.

For example, in the favorites volume 230 as shown in FIG. 4, the favorites manager 220 may determine websites, such as shopping A, game B, health C, broadcasting D, and newspaper E, as websites to be included in the favorites list. Also, the favorites manager 220 may arrange the fields of the favorites volume 230 by placing the website, health C, with the greatest number of visits at the top of the favorites list, and placing the website, shopping A, with the least number of visits and the most previous last visit time at the bottom of the favorites list. Also, when generating the favorites list, the favorites manager 220 may determine an exposure location of each of the websites in the favorites list to correspond to the arranged fields. According to the present exemplary embodiment, it is possible to generate the favorites list where the websites are sequentially arranged in an order of the websites, health C, game B, newspaper E, broadcasting D, and shopping A.

Figure 5:
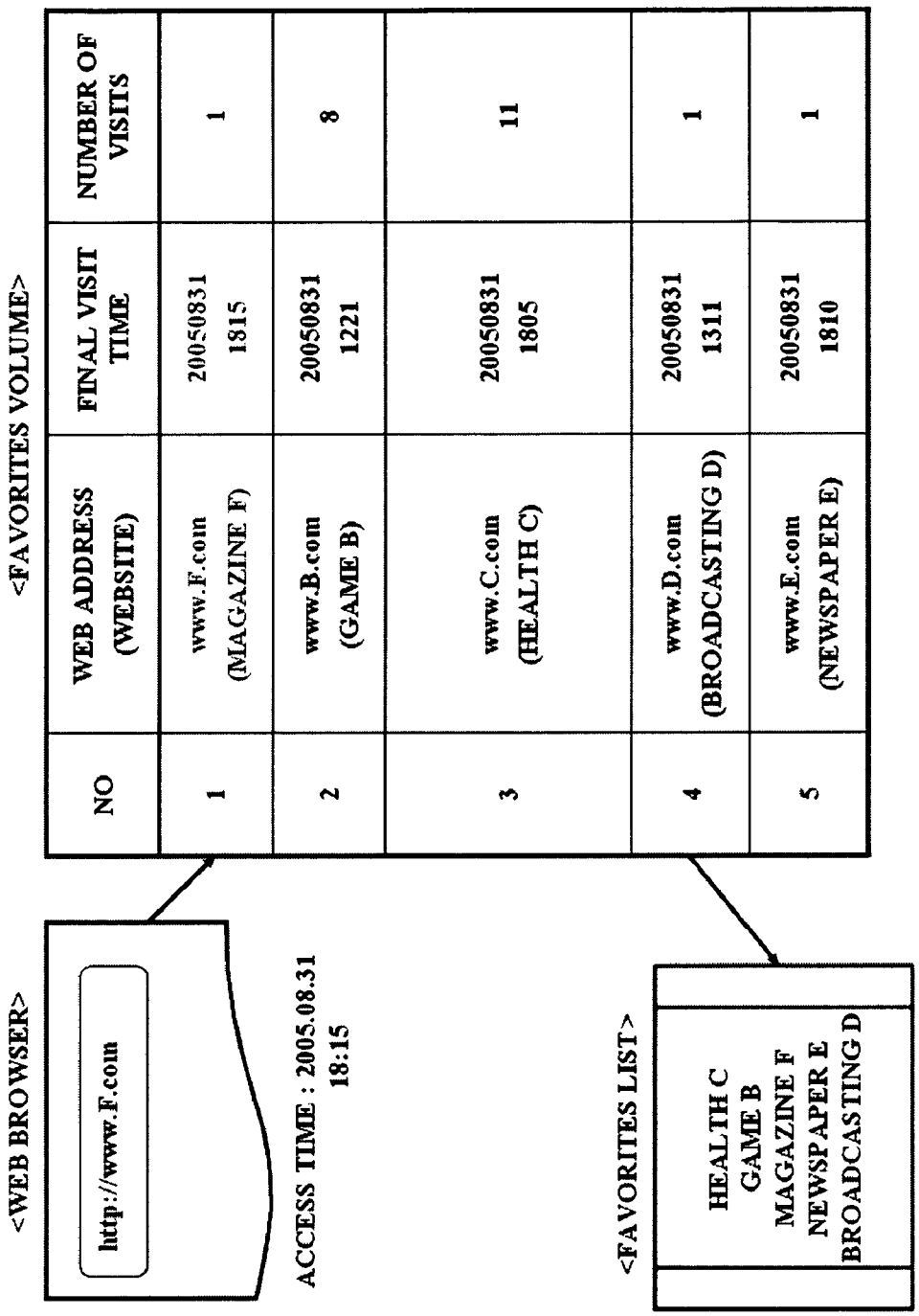
FIG. 5 is a diagram illustrating an example of recording information of a corresponding website in a field of a favorites volume when a user initially accesses the website, which is unregistered in favorites, and all other website information is recorded in the field of the favorites volume.

FIG. 5 is a diagram illustrating an example of recording information of a corresponding website in a field of a favorites volume when a user initially accesses the website, which is unregistered in favorites, and all other website information is recorded in the field of the favorites volume.

Initially, the favorites manager 220 determines whether information associated with a website, 'www.F.com', which the local computer 110 accessed, is recorded in the field of the favorites volume 230. As a result of the determination, when the favorites manager 220 determines that the accessed website of the local computer 110 is unregistered, i.e., an additional website, the favorites manager 220 identifies an empty field from the favorites volume 230.

In this case, when the empty field is not identified in the favorites volume 230, the favorites manager 220 may secure a field to record information by retrieving a field, which has less than n number of visits, from the fields of the favorites volume 230, and deleting information of the retrieved field. Next, the favorites manager 220 may record web address information of a corresponding website and last visit time information in the secured field of the favorites volume 230 by using the web address information and the visit time information which is received from the BHO manager 210, and record the number of visits as 1.

Also, when a plurality of fields, which has the number of visits less than n, is retrieved, the favorites manager 220 may retrieve a field, which has an earliest last visit time, from the plurality of fields.

For example, when the n is set as 1 in the favorites volume 230 as shown in FIG. 4, the favorites manager 220 may retrieve websites, shopping A, broadcasting D, and newspaper E, with the number of visits less than 1, and delete a field associated with the website, shopping A in this example, with the earliest last visit time of 200508301805, from the retrieved websites. After the deletion, the favorites manager 220 may record information associated with a website, magazine F, www.F.com, in the secured field, and thus, automatically register the website, magazine F as shown in FIG. 5.

When the field record is completed, or when the user 120 imports the favorites list, the favorites manager 220 arranges the plurality of fields of the favorites volume 230 according to the number of visits and the last visit time.

For example, in the favorites volume 230 as shown in FIG. 5, the favorites manager 220 may determine websites, such as game B, health C, broadcasting D, newspaper E, and magazine F, as websites to be included in the favorites list. Also, the favorites manager 220 may arrange the fields of the favorites volume 230 by placing the website, health C, with the greatest number of visits at the top of the favorites list and placing the website, broadcasting D, with the least number of visits and the earliest last visit time at the bottom of the favorites list. Also, when generating the favorites list, the favorites manager 220 may determine an exposure location of each website in the favorites list to correspond to the arranged fields. According to the present exemplary embodiment, it is possible to generate the favorites list where the websites are sequentially arranged in an order of the websites, health C, game B, magazine F, newspaper E, and broadcasting D.

Also, as another exemplary embodiment of FIG. 5, when the n is set as 1, and the number of visits, which is recorded in all the fields of the favorites volume 230, is greater than '2', the favorites manager 220 may determine that a current website, which is registered in favorites, is useful for the user 120 to maintain the favorites registration of the website, and reserve updating of the favorites volume 230. In this case, the favorites manager 220 neither deletes information of the fields nor performs a favorites registration of an additional website. Thus, according to the present disclosure, the favorites manager 220 may not automatically register web addresses of all accessed websites via the web browser 112. Also, the favorites manager 220 may arbitrarily register a web address to favorites according to the user's 120 recent website access trend.

Also, when an empty field is not included in the favorites volume 230, the favorites manager 220 may secure a field to record information about a website to be additionally registered in the favorites, by identifying a field of a website which is determined to have the user's 120 least number of visits, and deleting information of the identified field, based on the user's 120 search trend.

Also, an example of exposing a favorites list to a user according to another exemplary embodiment of the present disclosure will be described.

The favorites list, which is generated by the favorites manager 220, may be exposed to the user 120 via a favorites page which is included in the web browser 112. Here, the favorites page may be generated in a similar format to a general webpage of a web browser by the BHO manager 210 or the favorites manager 220 which is involved in retrieving local data. Specifically, the favorites list may be independently included in the favorites page of the web browser 112, and exposed to the user 120. Also, the favorites page may further include search result information about local data to provide to the user 120.

As described above, the favorites list may be exposed to the user 120 via the favorites page. Also, the favorites list may be exposed to the user 120 via a favorites function corresponding to a general web browser function.

Hereinafter, an operation of the automatic favorites registration system 200 according to an exemplary embodiment of the present disclosure will be described in detail with reference to FIG. 6. FIG. 6 is a flowchart illustrating an automatic favorites registration method according to an exemplary embodiment of the present disclosure.

In operation S610, the automatic favorites registration system 200 generates web address information of a website, which the local computer 110 has accessed, and visit time information of the local computer to the website, in the BHO manager 210 which is installed in the local computer 110, by using the web browser 112. Here, the web browser 112 is installed in the local computer 110.

Operation S610 is a process of connecting the local computer 110 to the website of the web address which the user 120 inputs into the web browser 112, and generating the web address information and the visit time information associated with the access of the local computer via the BHO manager 210. Here, the BHO manager 210 may generate the web address information in the form of, for example, a URL, a domain, an IP address, and the like. Also, the BHO manager 210 may generate the visit time information in the form of, for example, year-month-day-hour-minute, and the like, e.g., such as that discussed above regarding FIGS. 3 through 5.

In operation S620, the automatic favorites registration system 200 transmits the generated web address information and the visit time information from the BHO manager 210 to the favorites manager 220 which is installed in the local computer 110.

Operation S620 is a process of transmitting information of a corresponding website to the favorites manager 220 as the local computer 110 accesses the website. Here, the favorites manager 220 registers an address of the website, which the local computer 110 accessed, to favorites.

In operation S630, the automatic favorites registration system 200 imports the favorites volume 230 in the favorites manager 220. Operation S630 is a process of connecting the favorites volume 230 to register the accessed website of the local computer 110 to the favorites. Here, the favorites volume 230 includes a field which records a web address of a previously registered website, a last visit time, and a number of visits. In this instance, a number of fields to be included in the favorites volume 230 may be limited by a predetermined number depending upon the capacity of the favorites volume 230, a system environment, and the like.

In operation S640, the automatic favorites registration system 200 checks in the favorites manager 220 whether a field corresponding to the received web address information is included in the imported favorites volume 230. Operation S640 is a process of determining whether the accessed website of the local computer 110 is registered in the favorites.

When the field associated with the accessed website is determined to be included in the favorites volume 230 in operation S640, i.e. a yes direction of operation S640, the automatic favorites registration system 200 determines that the local computer's 110 current website access corresponds to re-accessing of the website which is registered in the favorites. Thus, in operation S650, the automatic favorites registration system 200 increases the number of visits of the field, which is associated with the accessed website, by 1, and updates and records the last visit time to the visit time information which is received from the BHO manager 210.

However, when the field associated with the accessed website is determined to not be included in the favorites volume 230, i.e. a no direction of operation S640, the automatic favorites registration system 200 identifies an empty field from the favorites volume 230, and records information associated with the accessed website of the local computer 110 in the identified empty field, based on the received web address information or the visit time information in operation S660. Specifically, operation S660 is a process of enabling an automatic favorites registration with respect to an accessed website of the local computer 110 by recording a web address of the accessed website, a last visit time, and a number of visits in the fields of the favorites volume 230.

Accordingly, the automatic favorites registration system 200 may automatically register a website, which the local computer 110 accesses, to favorites. In this case, the automatic favorites registration system 200 records the number of visits of an additionally recorded field as 1, and thereby, clearly describes that the local computer 110 has initially accessed a corresponding website after the website is automatically registered in the favorites.

Also, when the empty field is not identified from the favorites volume 230 in operation S660, the automatic favorites registration system 200 may secure a field to record information of a website to be additionally registered in the favorites by deleting an existing field, which the local computer 110 has least accessed recently, from websites which are registered in the favorites.

For example, the automatic favorites registration system 200 may retrieve a field, which has an earliest last visit time, from fields of which each has less than n number of visits, when all the fields of the favorites volume 230 are recorded, and delete information of the retrieved field, e.g., such as that discussed above regarding FIG. 5.

In this instance, when the number of visits of each field of the favorites volume 230 is greater than the n, the automatic favorites registration system 200 may determine that the registered website is more useful as information than an additional website to be registered in the favorites, and stops deletion of the field, i.e., stops securing the empty field as described above, and cancel the favorites registration of the additional website.

As described above, according to the present disclosure, it is possible to enable a favorites registration with respect to only an optimal website for the user's 120 search trend, without registering all websites, which the local computer 110 accesses, to the favorites.

Specifically, the automatic favorites registration system 200 may maintain a favorites registration of a website, which the user 120 has frequently accessed even recently, among the registered websites. Also, the automatic favorites registration system 200 may induce a favorites registration of an additional website by canceling the favorites registration of the website which the user 120 has recently accessed the least number of times.

Also, according to another exemplary embodiment of the present disclosure, when the user 120 has not accessed a predetermined website, which was registered in the favorites, during a predetermined period of time and thus, the last visit time or the number of visits of the field of the corresponding website is fixed to a predetermined number, the automatic favorites registration system 200 decreases the number of visits of the field by 1. This is to register only an optimal website for the user's 120 search trend to favorites by giving a predetermined penalty to a website with a least connection with the local computer 110, and decreasing a probability that the website may be included in the favorites list.

Also, when updating the favorites volume 230 or when a favorites request is received from the user 120, the automatic favorites registration system 200 arranges a plurality of fields of the favorites volume 230 according to the number of visits and the last visit time of the fields, and generates the favorites list so that websites or web addresses of the websites are sequentially arranged in operation S670.

For example, the automatic favorites registration system 200 may arrange the fields so that a field with the greatest number of visit and, in the case of fields with the identical number of visits, a field with a comparatively recent last visit time are placed in a comparatively higher location in the favorites list, and generate the favorites list where the websites are sequentially arranged according to the arranged fields.

The automatic favorites registration system 200 may provide an automatic favorites registration service according to the present disclosure by providing the generated favorites list to the user 120 who transmitted the favorites request.

Specifically, according to the present disclosure, it is possible to automatically register a website which the local computer 110 accesses, and also to register only an additional website, which is determined to be optimal for the user's 120 convenience, or maintain a favorites registration of the website according to the user's 120 recent search trend.

The automatic favorites registration method according to the above-described embodiment of the present disclosure may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure.

As described above, according to the present disclosure, there is provided an automatic favorites registration method and system which can automatically register a website which a local computer accessed, and also can register only an additional website which is determined to be optimal for a user's convenience, or maintain a favorites registration of the website according to the user's recent search trend.

Also, according to the present disclosure, there is provided an automatic favorites registration method and system which can maintain a favorites registration of a website, which a user has frequently accessed recently, among the registered websites, and also can induce a favorites registration of an additional website by canceling the favorites registration of the website which the user has least accessed recently.

Also, according to the present disclosure, there is provided an automatic favorites registration method and system which can retrieve local data of a local computer via a web browser without executing another search program.

Although a few exemplary embodiments of the present disclosure have been shown and described, the present disclosure is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A computer-implemented method of automatically adding or registering favorite websites of a user, the method comprising:
   determining, on a computer, a website address associated with a website visited by a user, using a browser manager on the computer;
   determining, on the computer, website information comprising a time of visit and a number of visits to the visited website using the browser manager on the computer;
   storing the determined website address and the determined website information in a memory;
   checking if the determined website address stored in the memory is included in a volume stored on a computer-readable medium coupled to the computer, the volume comprising information that indicates registered favorite websites of the user and a plurality of fields; and
   updating, automatically without approval by the user, the volume with at least one of the website address and the website information based on the check of the website address stored in the memory and the volume,
   wherein the updating comprises:
      identifying, if the volume does not comprise the determined website address, an empty field from the fields of the volume; and
      storing the determined website address and the determined website information to the empty field,
   wherein identifying the empty field comprises:
      retrieving, if all the fields of the volume are full, a field comprising less than n number of visits from the fields of the volume, where n is a natural number;
      deleting information of the retrieved field; and
      identifying the retrieved field as the empty field, and
   wherein the retrieving comprises:
      retrieving a field having an unchanged time of visit for a time interval; and
      decreasing the number of visits of the retrieved field.

2. The method of claim 1, wherein the retrieving further comprises:
   retrieving a field having an earliest visit time from a plurality of fields having less than the n number of visits.

3. The method of claim 1, wherein the updating comprises:
   storing the determined website information in the volume if the website address information is included in the volume.

4. The method of claim 1, further comprising:
   arranging the fields of the volume according to the number of visits or the visit time; and
   generating a favorites list so that exposure locations of the websites correspond to the arranged fields; and
   providing a user with the generated favorites list in response to a favorites list request by the user.

5. The method of claim 1, further comprising:
   receiving a local data retrieval request from a user; and
   providing the user with a local data retrieval result via a web browser in response to the received local data retrieval request.

6. The method of claim 1, further comprising:
   generating a favorites list from the volume, the favorites list being provided by a web browser, and
   providing the generated favorites list to a user.

7. The method of claim 1, wherein the website information is determined by a browser helper object (BHO) manager module.

8. A tangible computer-readable medium storing a program comprising computer-executable program code for implementing the method of claim 1.

9. A favorites registration system, comprising:
   a computer;
   a browser manager configured to run on the computer and to determine if a web browser running on the computer accesses a website, the browser manager being further configured to determine website address information associated with the accessed website and to determine website information comprising a time of visit and a number of visits to the accessed website; and a favorites manager configured to run on the computer to store the determined website address and the determined website information in a memory, to check if the determined website address is included in a volume stored on a computer-readable medium coupled to the computer, the volume comprising information that indicates registered favorite websites of a user and comprising a plurality of fields, the favorites manager further configured to automatically update, without approval by the user, the volume with at least one of the website address and the website information if the website address and website information are stored in the memory and the volume, to retrieve, if all the fields of the volume are full, a field having less than n number of visits from the fields of the volume, to delete information of the retrieved field, and to identify the retrieved field as the empty field, wherein n is a natural number, wherein the favorites manager is configured to retrieve a field having an unchanged time of visit for a time interval, and to decrease the number of visits of the retrieved field.

10. The system of claim 9, wherein the favorites manager is configured to identify an empty field from fields of the volume if the determined website address is not provided in the volume, and to store the determined website address and the determined website information to the empty field.

11. The system of claim 9, wherein the favorites manager is further configured to store the determined website information in the volume if the website address information is provided in the volume.

12. The system of claim 9, wherein the browser manager is further configured to receive a local data retrieval request from the user, and to provide the user with a local data retrieval result via the web browser in response to the received local data retrieval request.

13. The system of claim 9, wherein the browser manager is further configured to generate a favorites list provided in the web browser, and to provide the generated favorites list to a user.

14. The system of claim 9, wherein the browser manager comprises a browser helper object (BHO) manager.

* * * * *